9/84 XR RE 31,697

United States Patent [19]

Gomberg et al.

[11] E Patent Number: Re. 31,697

[45] Reissued Date of Patent: Oct. 9, 1984

[54] RADIOLYTIC DISSOCIATIVE GAS POWER CONVERSION CYCLES

[75] Inventors: Henry J. Gomberg; John G. Lewis; John E. Powers, all of Ann Arbor, Mich.

[73] Assignee: KMS Fusion, Inc., Ann Arbor, Mich.

[21] Appl. No.: 292,839

[22] Filed: Aug. 14, 1981

Related U.S. Patent Documents

Reissue of:

[64] Patent No.: 4,229,942
Issued: Oct. 28, 1980
Appl. No.: 913,017
Filed: Jun. 6, 1978

[51] Int. Cl.[3] ..... G12D 5/00

[52] U.S. Cl. ..... 60/644.1; 60/649; 60/655; 204/157.1 H; 376/148; 376/323; 376/907

[58] Field of Search ..... 60/643, 644.1, 645, 60/649, 650, 655, 673, 682, 721; 204/157.1 H; 176/9, 39; 422/186; 376/146, 148, 323, 907

[56] References Cited

U.S. PATENT DOCUMENTS

| | | | |
|---|---|---|---|
| 3,370,420 | 2/1968 | Johnson | 60/649 |
| 3,624,239 | 11/1971 | Fraas | 60/644.1 X |
| 4,097,348 | 6/1978 | Gomberg | 204/157.1 H |
| 4,132,727 | 1/1979 | Gomberg | 204/157.1 H |
| 4,144,150 | 3/1979 | Gomberg et al. | 204/157.1 H |

*Primary Examiner*—Allen M. Ostrager
*Assistant Examiner*—Stephen F. Husar
*Attorney, Agent, or Firm*—Barnes, Kisselle, Raisch, Choate, Whittemore & Hulbert

[57] ABSTRACT

Gas and combined gas/steam power cycles in which chemical energy is stored in a gaseous working fluid by radiolytic dissociation at a temperature below the temperature of thermodynamic macroscopic dissociation, such that the dissociated portion of the working fluid exists under conditions of macroscopic thermal non-equilibrium. The dissociated fluid components are then recombined with the energy of recombination adding heat to the working fluid for extraction in the power cycle.

5 Claims, 6 Drawing Figures

RADIOLYTIC DISSOCIATIVE GAS POWER CONVERSION CYCLES

Matter enclosed in heavy brackets [ ] appears in the original patent but forms no part of this reissue specification; matter printed in italics indicates the additions made by reissue.

The present invention relates to power conversion cycles and, more specifically, to gas and combined gas/-steam power cycles.

It has heretofore been recognized that a chemical fluid mixture may be subjected to radiation so that individual molecules within the mixture are microscopically dissociated at or near the temperature of the mixture as a whole. This phenomenon is termed radiolytic dissociation, and may be contrasted with the more common thermal dissociation phenomenon wherein the fluid molecules are dissociated under the influence of heat. Where the temperature of the mixture as a whole is below the temperature of thermal molecular dissociation, the mixture, including both dissociated and undissociated components, is said to be in macroscopic thermal non-equilibrium. Chemical energy is stored in the dissociated components separate and apart from, and in addition to, any stored energy associated with vaporization of the mixture (change of phase) and thermal energy (increase in temperature).

Even a small fraction of chemical dissociation will store energy in the fluid mixture which is significant relative to stored thermal energy. For example, the dissociation of only one percent of initially pure carbon dioxide yields a mixture containing about one percent carbon monoxide and about one-half percent oxygen in a carbon dioxide fluid mixture, and the chemical energy of the dissociation products is equivalent to the amount of stored thermal energy when the mixture is increased 110° F. in temperature over a starting temperature of 500° F., for example, at one atmosphere. (All percentages herein are by weight unless otherwise specified.) In accordance with the present invention, all or a substantial portion of the chemical energy sorted in the working fluid under macroscopic thermal non-equilibrium conditions is available for use in power production cycles as work output of a turbine when the dissociation, recombination and expansion all occur at the same temperature. Accordingly, it is an object of the present invention to provide gas and/or combined gas/steam power cycles which employ the principle set forth immediately above.

The invention, together with additional objects, features and advantages thereof, will be best understood from the following description, the appended claims and the accompanying drawings in which:

Figure 1:
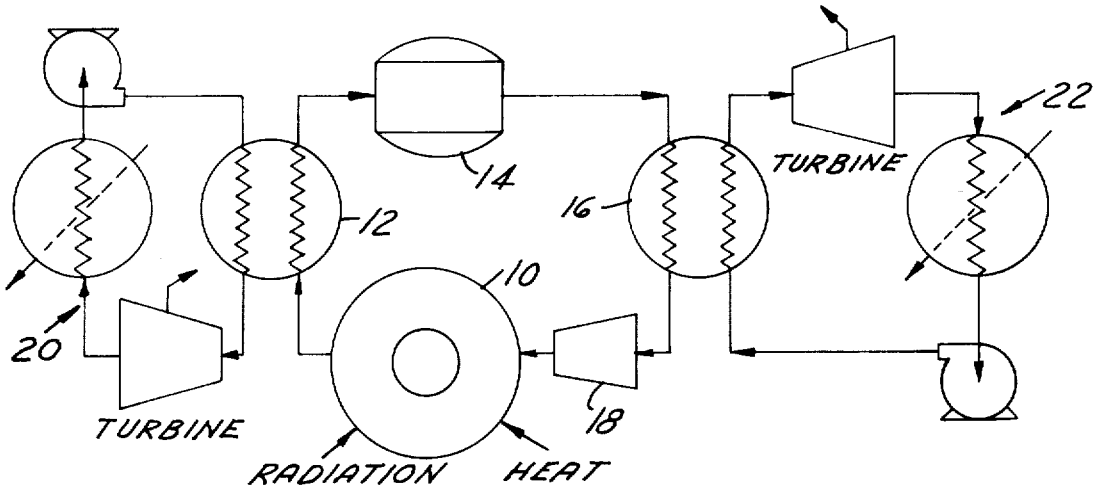
FIG. 1 is a schematic diagram of a power cycle in accordance with the invention which is generally analogous to conventional steam power cycles.

In the embodiment of FIG. 1, a chamber 10 having a working fluid input and output is positioned to receive radiation energy from a source (not shown). The radiation source may comprise a conventional nuclear fission reactor in which about ten percent of the energy from each reaction event is available as radiation effect-producing energy in the form of neutrons (five mega electron volts or m.e.v.) and alpha particles (twelve m.e.v.). The radiation-effect energy yield may be increased to about eleven and one-half percent by providing quantities of boron-ten or lithium-six within chamber 10 in the form of a chamber blanket, rods, liquid or mist, etc. Nuclear fusion reactors may also be used as radiation energy sources. In the deuterium-tritium fusion process, 17.6 mega electron volts are released as 3.5-mev alpha particles and 14.1 mev neutrons. All of the fusion energy is available as radiation-effect producing energy where the energy producing reaction occurs in substantially direct contact with the working fluid. Other exemplary radiation sources are cyclotrons, particle accelerators, gamma-ray cources and X-ray machines.

The working fluid within chamber 10 may be subject also to heat from an external source (not shown). The heat source may be the same nuclear fission reactor which acts as the radiation source in one example discussed above. In the example of the fusion reactor, all of the energy may be introduced initially as radiation-effect producing energy, part of which is converted to thermal energy. A conduit feeds working fluid from chamber 10 through a heat exchanger 12, such as a boiler, to a chemical reactor 14. Reactor 14 is connected through a second boiler 16 and a compressor 18 to the fluid input of chamber 10 to complete a closed loop for the primary working fluid. Conventional steam power systems 20, 22 are connected to boilers 12, 16 such that the latter function as heat sources for the steam power cycles.

Figure 4:
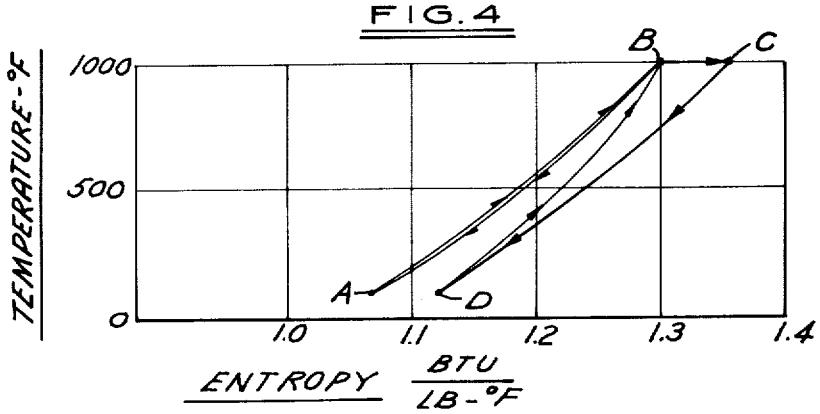
FIGS. 4–6 are exemplary T-S diagrams for the power cycles illustrated in FIGS. 1–3 respectively.

Operation of the embodiment of FIG. 1 will be best understood with simultaneous reference to FIG. 4 which is a T-S diagram for carbon dioxide as a working fluid. It will be appreciated that operating parameters of the type described herein may be varied substantially, and that the following description is intended to be merely illustrative.

Point A indicates the condition of the carbon dioxide working fluid at an assumed temperature of 100° F. and pressure of ten atma. (atmospheres absolute) at the inlet of compressor 18. The pressure [decrease] *increase* is only enough to overcome pressure drop of circulation. Consequently, the exit from the compressor 18 is also approximated by point A. The effect at reactor 10 may be envisioned as two steps: (1) carbon dioxide is heated at ten atma. from 100° F. to 1000° F. along curve A–B; and (2) carbon dioxide is then dissociated at 1000° F. to 8.09% dissociation along curve B–C. Alternatively, the properties changing from point A could be shown by one path directly to point C. In either alternative, a radiolytic efficiency of approximately sixty percent is implied in FIG. 4, i.e., sixty percent of input radiolytic energy is converted to chemical energy and the balance is converted to heat. The partly dissociated working fluid mixture would then be cooled from 1000° F. to 100° F. along the constant pressure line C–D at ten atma. during its passage through heat exchanger or boiler 12. The dissociated portion of the fluid would undergo recombination to carbon dioxide in passing through reactor 14, thereby traversing line D–B, a path of constant enthalpy. During recombination, it would be increased in temperature from 100° F. to 1000° F. while remaining at about ten atma. The gas would then be cooled in boiler 16 traversing the path B–A of cooling carbon dioxide, arriving at the end of the cycle.

The percentage of initially pure carbon dioxide dissociated is different from but approximates in the example given the percentage of carbon monoxide in the dissociated mixture. Assuming that one mole of carbon dioxide is dissociated to yield Y moles of carbon monoxide:

$$CO_2 \longrightarrow (Y)CO + \left(\frac{Y}{2}\right) O_2 + (1 - Y)CO_2.$$

The total number of moles of dissociated product is equal to $$Y + \frac{Y}{2} + (1 - Y) = 1 + \frac{Y}{2}.$$

The percentage of carbon monoxide in the dissociation product equals $$\frac{Y}{1 + \frac{Y}{2}} \times 100.$$

For 8.09% dissociation Y=0.0809, and the percentage of carbon monoxide in the mixture is $$\frac{0.0809}{1 + \frac{1}{2}(0.0809)} \times 100 = 7.775\%.$$

It will be appreciated that the power generated per unit mass of primary working fluid in the embodiment of FIG. 1 is about twice that which would otherwise result were the fluid in chamber 10 to store only thermal energy at 1000° F. More specifically approximately equivalent amounts of thermal and chemical energy are stored in the working fluid, the thermal energy being extracted by boiler 12 and the chemical energy being extracted by the combined effect of reactor 14 and boiler 16. Moreover, it will be appreciated that, although twice as much energy is effectively stored in the working fluid, because this energy is stored in two forms (thermal and chemical), each individual boiler is only subjected to a maximum temperature of about 1000° F. and a temperature decrease of 900° F. of the carbon dioxide as it flows through the boiler, parameters which are well within existing technology.

Furthermore, it will be apparent that the embodiment of FIG. 1 is readily useful and, indeed, is uniquely adapted for use in power generation systems, such as nuclear power systems, wherein energy from the primary source is available in both thermal and radiation forms. Thus, the radiation energy need not be first converted to thermal energy prior to transfer to the working fluid, as is presently done, with consequent inefficiencies and energy losses. Rather the working fluid may itself directly convert the radiation energy to stored chemical energy, which automatically eliminates at least one energy transfer step.

The embodiment of FIG. 1 is also readily adaptable for use where the available source energy is primarily radiation. For example, working fluid may be made available in chamber 10 in sufficient concentration to permit about 16.2 percent of entering carbon dioxide to be dissociated by the incident radiation energy with the fluid leaving chamber 10 at 100° F. A chemical reactor may then be provided between chamber 10 and boiler 12 to convert half of the chemical energy thus stored into heat, thereby heating the fluid from 100° F. to the boiler input temperature of 1000° F. The fluid would be cooled from 1000° F. to 100° F. in boiler 12. Then the other half of the stored chemical energy would be converted to heat in reactor 14, reheating the fluid from 100° F. to 1000° F. Then the fluid would be cooled in boiler 16° to 100° F. The fluid is then fed by compressor 18 to chamber 10 and the cycle is repeated. Extending the suggested modification, additional reactors and boilers may be added to the primary power cycle as higher percentages of primary working fluid are dissociated, the practical limit being set by the ability to transport partially dissociated working fluid at temperatures far removed from thermal equilibrium and the relationship between stored chemical energy and the equivalent amount of thermal energy for the particular working fluid.

Figure 2:
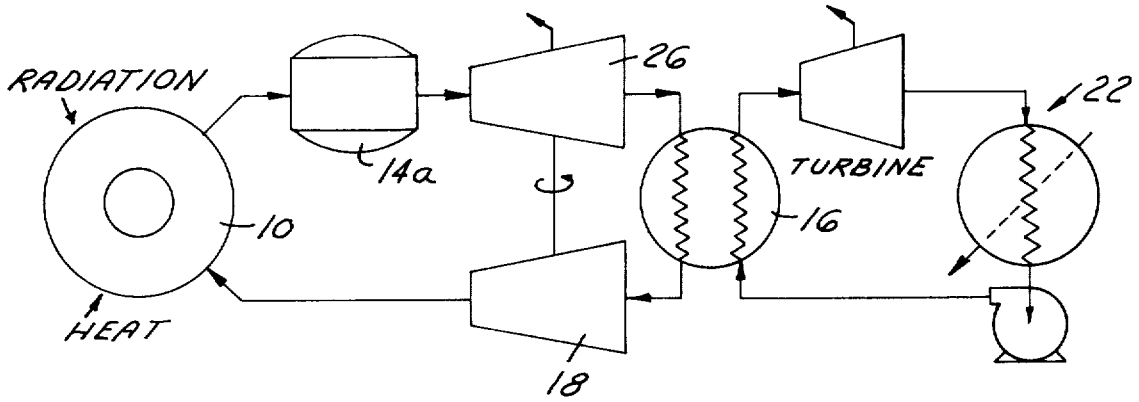
FIG. 2 is a schematic diagram of a combined gas/-steam power cycle in accordance with the invention.
Figure 5:
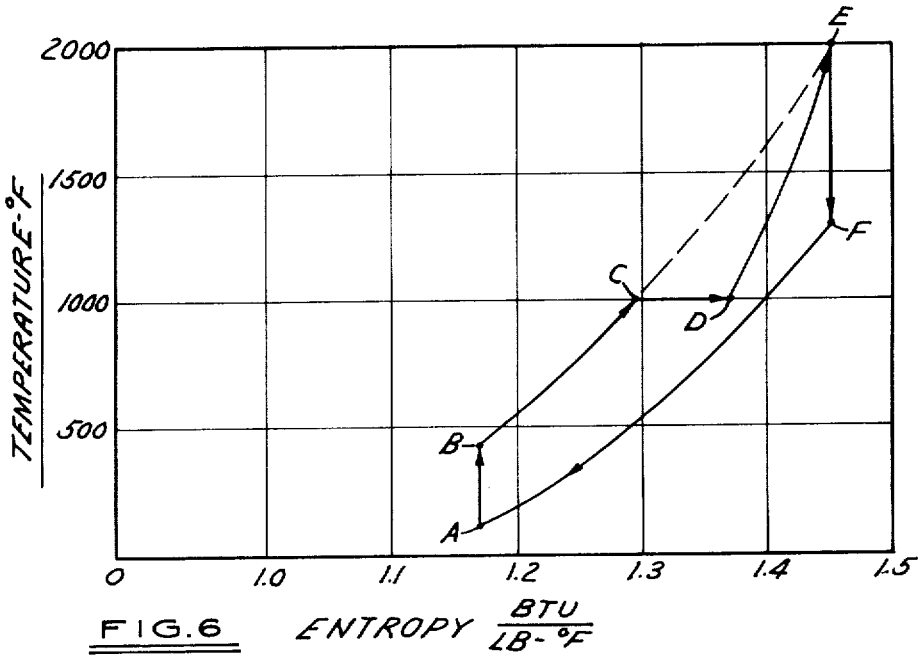

In the modified power system of FIG. 2, the exhaust from chamber 10, which is at 1000° F., and with the carbon dioxide dissociated to the extent of 10.7%, is connected directly to a chemical reactor 14a in which the dissociated fluid components are recombined to heat the working fluid to about 2000° F. The fluid is then fed through a conventional gas turbine 26 and boiler 16 to compressor 18 and the input of chamber 10. Thus, in the embodiment of FIG. 2, the working fluid temperature is raised to about 2000° F. when the dissociated fluid components are recombined in reactor 14a. Work is extracted from the working fluid by turbine 26 which has an exhaust temperature of 1000° F., typically, and by boiler 16 through steam cycle 22. As is conventional, compressor 18 is driven by turbine 26. FIG. 5 shows the course of the properties of the working fluid in going through the cycle of FIG. 2. Point A corresponds to the inlet of compressor 18 of FIG. 2 with the working fluid comprising carbon dioxide at 100° F. and one atma pressure. Passage through compressor 18 is shown A-B, assuming isentropic compression. Passage through chamber 10 is shown in two steps: B-C heating at constant pressure to 1000° F., and C-D dissociation at constant temperature to about 10.7% dissociation. The recombination of exhaust from 10 in reactor 14a of FIG. 2 is shown by traversing the line of constant enthalpy D-E, the temperature thereby increasing from 1000° F. to about 1992° F., all at 10 atma. The gas passes through turbine 26 of FIG. 2, shown as isentropic expansion line E-F in FIG. 5. The pressure at point F is one atma. The gas then traverses heat exchanger 16 of FIG. 2, being cooled thereby to 100° F. at one atma as indicated by path F-A, a line of cooling at constant pressure.

Figure 3:
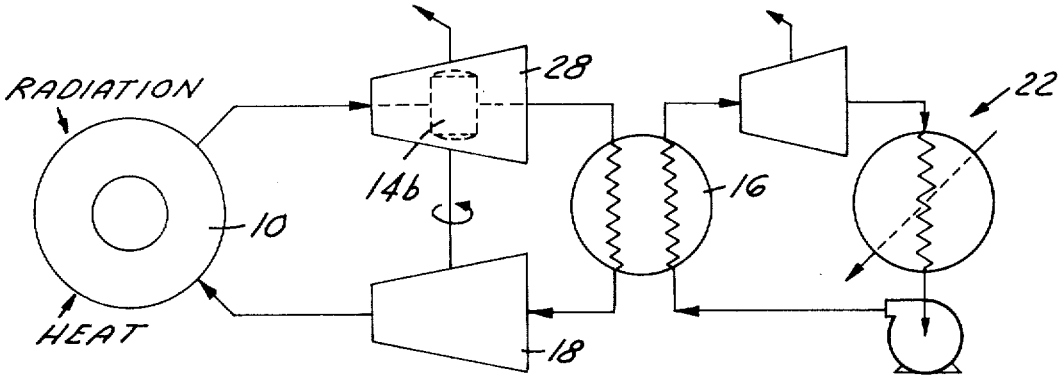
FIG. 3 is a schematic diagram of a modification to the power cycle of FIG. 2.
Figure 6:
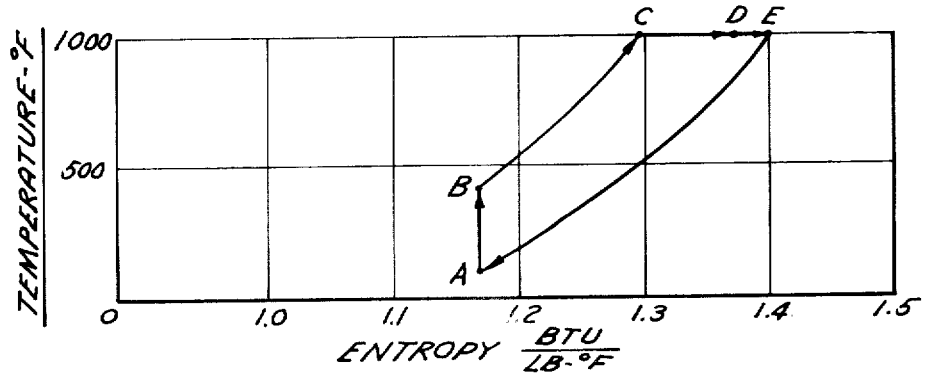

In the modification of FIG. 3, the exhaust from chamber 10 is fed directly to a turbine 28 wherein the chemical recombination of the dissociated fluid components and the volumetric expansion of the working fluid take place in such a way as to result in a substantially adiabatic and isothermal reaction within the turbine. Turbine 28 may comprise a plurality of turbine chambers with chemical reactors 14b located therebetween, a percentage of the dissociated fluid components being recombined in each intermediate reactor 14b in an alternating sequence of respectively isentropic expansions and isenthalpic reaction steps so as to approach continuously isothermal conditions as closely as desired. FIG. 6 shows the course of the properties of the working fluid in going through the cycle of FIG. 3 in such a way that a constant temperature is maintained during recombining flow through the turbine. Beginning at Point A, corresponding to the inlet of compressor 18 of FIG. 3, isentropic compression is indicated by line A–B. The effect of chamber 10 is approximated by heating on line B–C at the constant pressure of 10 atma, followed by constant temperature dissociation C–D to about 5.48% dissociation. Line D–E shows the passage of the gas through chemical reactor 14b and turbine 28 of FIG. 3. The gas is caused to recombine and to expand in such a way as to maintain substantially the constant temperature of 1000° F. with no heat being exchanged with the surroundings. The recombination-expansion is therefore isothermal and also adiabatic. Passage through heat exchanger 16 of FIG. 3 is indicated by line E–A, a step of cooling at a constant pressure of one atma from 1000° F. to 100° F.

One may note that FIG. 5 bears resemblance to a Brayton cycle. In FIG. 5, the traversal of broken line C–E instead of path C–D–E would yield a Brayton cycle. The example of FIG. 5, however, limits the temperature reached in chamber 10° to 1000° F. while delivering gas at 1992° F. to the turbine. The estimated efficiency for the cycle shown is 31.8% if compressor 18 and turbine 26 operate isentropically. The compressor is said to be 80% efficient when it requires an input of 1.25 times isentropic power. The trubine is 80% efficient when it delivers 80% of isentropic power. The efficiency of the cycle of FIG. 5 is estimated to be 18.7% when using a compressor and a turbine of 80% efficiency. An air cycle would have an efficiency of 48% when operating between 100° F. and 2000° F. with a pressure ratio of ten, and isentropic compressor and turbine. That air cycle would have an efficiency of 23.8% when using the same conditions except that compressor and turbine efficiencies were 80%. In the example of FIG. 6, a cycle is presented in which both chamber and turbine temperatures are limited to 1000° F., while yielding a cycle efficiency of about 26% if compressor 18 and turbine 28 operate isentropically or 10% if the compressor and turbine are of 80% efficiency.

In the following Table I, a comparison is made among several cycles of the amount of net work delivered per unit weight of working fluid. All cycles in this example operate between 100° F. and 2000° F. with a pressure ratio of ten, and compressor and turbine efficiencies of 80%.

TABLE I

| Type of cycle | Working fluid | Net work delivered calories per gram | Cycle Efficiency Percent |
|---|---|---|---|
| Brayton FIG. 5 | carbon dioxide | 44.6 | 18.7 |
| Brayton | air | 40.4 | 23.8 |
| Isothermal-adiabatic (FIG. 6) | carbon dioxide | 61.9 | 16.3 |

The isothermal-adiabatic cycle of FIG. 6 operating at 100° F. to 1000° F. (not shown in Table I) would deliver 15.7 calories per gram using a compressor and a turbine of 80% efficiency, and it would have a cycle efficiency of 10%. A Brayton cycle operating on carbon dioxide under the same conditions would deliver 4.3 calories per gram with a cycle efficiency of 5.9%.

Note from Table I that in FIG. 5 dissociating the carbon dioxide at 1000° F. and then allowing it to recombine and heat to 1992° F. yields a cycle which delivers 44.6 calories per gram, somewhat higher then that delivered by the corresponding air cycle at 40.4 calories per gram. An engine of smaller cross-sectional area is needed for the carbon dioxide cycle than for the air cycle. However, the efficiency of the carbon dioxide cycle is 18.7% and the efficiency of the air cycle is 23.8%. Note also that isothermal-adiabatic cycle of FIG. 6 with an 80% efficient compressor and turbine would yield more than three times the work output per gram of carbon dioxide than would the carbon dioxide Brayton cycle when both are operated between 100° F. and 1000° F. with a pressure ratio of ten. The isothermaladiabatic cycle would also have an efficiency of 10%, compared with 5.9% for the Brayton cycle. An air Brayton cycle evidently would have no net output at 1000° F. with other conditions the same as just described.

Comparing the effect of top cycle temperature on the characteristics of the isothermal-adiabatic and the Brayton cycles, the isothermal-adiabatic cycle of the invention is more efficient and requires a smaller engine than does the Brayton cycle when operating between 100° F. and 1000° F. on carbon dioxide at a pressure ratio of ten, with 80% efficient turbines and compressors. The air cycle delivers no net output under such conditions. When operating between 100° F. and 2000° F., the isothermal-adiabatic cycle using carbon dioxide is less efficient but requires a smaller engine than does a Brayton cycle using either carbon dioxide or air, it being understood that all three cycles operate at a pressure ratio of ten and with 80% efficient turbines and compressors.

The use of chemical dissociation and recombination as described makes possible the isothermal-adiabatic step in a heat-engine power cycle. The use of a substantially or nominally adiabatic step in such a power cycle is well-known. However, it has previously not been known how to conduct a substantially or nominally isothermal step sufficiently rapidly to be employed is such a power cycle. The invention described herein teaches how to accomplish such an isothermal step which is also substantially adiabatic. The use of chemical dissociation and recombination as described also makes possible the use of what is essentially a Brayton cycle in which the expansion engine portion of the cycle can be operated at a much higher temperature than the portion of the cycle in which chemical dissociation takes place.

Thus, the invention in its broadest aspects relates to a power cycle which includes the steps of adding heat to a working fluid at high pressure to raise the working fluid to high temperature and withdrawing heat from the working fluid at reduced pressure. In accordance with the invention, the step of adding heat to the working fluid comprises the steps of (a) chemically dissociating at least a portion of the working fluid by radiolysis at a temperature below the thermal equilibrium temperature of the dissociated working fluid such that the dissociated working fluid is at macroscopic thermal non-equilibrium, and (b) chemically reacting dissociated components of the working fluid with each other to recombine the components and simultaneously heat the working fluid. The advantages of this technique lies in obtaining a high-temperature working fluid from an energy source which operates at a lower temperature.

In step (a) above in which chemical dissociation occurs, some fraction of the input energy will be converted to heat. The desired effect is to utilize as much of the input energy as possible in chemical dissociation.

In accordance with a second important aspect of the invention discussed in connection with FIGS. 3 and 6, step (b) is carried out while simultaneously expanding the dissociated components in a turbine or the like so as to maintain a constant temperature of the working fluid throughout the process of recombination and expansion. The modified technique obtains work from a working fluid while maintaining both the energy source and the turbine or the like at the lower operating temperature previously mentioned. It may be noted that the amount of energy carried per unit mass of working fluid is increased over that of a conventional power plant approximately in the proportion of the higher temperature which the gas would reach upon free recombination to the temperature at which it leaves the dissociator. Both temperatures are assumed to be measured above a common attainable datum, e.g., 100° F.

It will be appreciated that the foregoing discussion of the invention is merely exemplary in many aspects, and that no undue limitations should be inferred therefrom. For example, percentage dissociation of the working fluid for the various embodiments may vary according to the amount of radiation-effect producing energy available. Similarly, carbon dioxide has been discussed as a potential working fluid, and is presently preferred. However, the invention in its broadest aspects is not so limited, and many other working fluids are envisioned. Indeed, the invention is intended to embrace all of the alternatives, modifications and variations as fall within the spirit and broad scope of the appended claims.

the invention claimed is:

1. In a power cycle which includes the steps of adding heat to a working fluid [at high pressure] to raise said working fluid to high temperature and *subsequently* withdrawing heat from said working fluid [at reduced pressure], the improvement wherein said step of adding heat to said working fluid comprises the steps of: (a) chemically dissociating at least a portion of said working fluid by radiolysis at a temperature below the thermal equilibrium temperature of said dissociated working fluid such that said dissociated working fluid is at macroscopic thermal non-equilibrium, and (b) chemically reacting dissociated components of said working fluid with each other to recombine said components and simultaneously heat said working fluid.

2. The power cycle set forth in claim 1 *wherein said step (a) is carried out at elevated pressure, and* wherein said step (b) is carried out while substantially simultaneously:

(c) expanding said components so as to maintain a constant temperature of the working fluid throughout the process of recombination and expansion.

3. The power cycle set forth in claim 2 wherein said step (c) is performed in a rotary fluid engine.

4. The power cycle set forth in claim 2 wherein said steps (b) and (c) are performed while directing said fluid through means including rotary fluid engine means.

5. The power cycle set forth in claims 2, 3 or 4 wherein said steps (b) and (c) are carried out under substantially isothermal and adiabatic conditions.

* * * * *